(12) United States Patent
Suzuki

(10) Patent No.: US 8,379,669 B2
(45) Date of Patent: Feb. 19, 2013

(54) CONVERSION APPARATUS

(75) Inventor: Muneyuki Suzuki, Inagi (JP)

(73) Assignee: Kabushiki Kaisha Toshiba, Tokyo (JP)

(*) Notice: Subject to any disclaimer, the term of this patent is extended or adjusted under 35 U.S.C. 154(b) by 465 days.

(21) Appl. No.: 12/694,635

(22) Filed: Jan. 27, 2010

(65) Prior Publication Data

US 2010/0189127 A1 Jul. 29, 2010

(30) Foreign Application Priority Data

Jan. 28, 2009 (JP) ................... 2009-016964

(51) Int. Cl.
*H04J 3/16* (2006.01)
(52) U.S. Cl. ....................................... 370/466
(58) Field of Classification Search .................. 370/242, 370/245, 442, 465–467
See application file for complete search history.

(56) References Cited

U.S. PATENT DOCUMENTS

| 7,457,315 | B1* | 11/2008 | Smith | 370/473 |
| 7,590,070 | B1* | 9/2009 | Asawa et al. | 370/252 |
| 7,613,212 | B1* | 11/2009 | Raz et al. | 370/510 |
| 7,620,074 | B2* | 11/2009 | Yasuda et al. | 370/503 |

FOREIGN PATENT DOCUMENTS

| JP | 05-244203 | 9/1993 |
| JP | 7-95190 | 4/1995 |
| JP | 2001-94562 | 4/2001 |
| JP | 2003-60736 | 2/2003 |

OTHER PUBLICATIONS

English language machine translation of japanese publication 05-244203.*
JP2000-049841—english machine translation.*
JP2006-339731—english machine translation.*
JP2007-267421—english machine translation.*
Notification of Reasons for Rejection issued by the Japanese Patent Office in Japanese Patent Application No. 2009-016964 on Nov. 25, 2010 and English translation of same (6 pages total).

* cited by examiner

*Primary Examiner* — Hassan Kizou
*Assistant Examiner* — Ashil Farahmand
(74) *Attorney, Agent, or Firm* — Finnegan, Henderson, Farabow, Garrett & Dunner, L.L.P.

(57) ABSTRACT

A conversion apparatus includes a first interface unit connecting to an asynchronous communication network to receive a packet signal, a signal conversion unit converting the packet signal into an intra-apparatus signal, a packet-discard determination unit determining whether or not any portion of the packet signal is discard, a clock selection unit selecting a reference clock signal, a loss-of-synchronization determination unit determining whether or not a loss-of-synchronization error is occurring in the reference clock signal, an alarm control unit generating one of first, second, and third control signals, a framer generating a frame signal in response to the first control signal, an alarm signal in response to the second control signal, and a synchronous signal in response to the third control signal, and a second interface unit connecting to a synchronous communication network to transmit one of the frame signal, the alarm signal, and the synchronous signal.

4 Claims, 3 Drawing Sheets

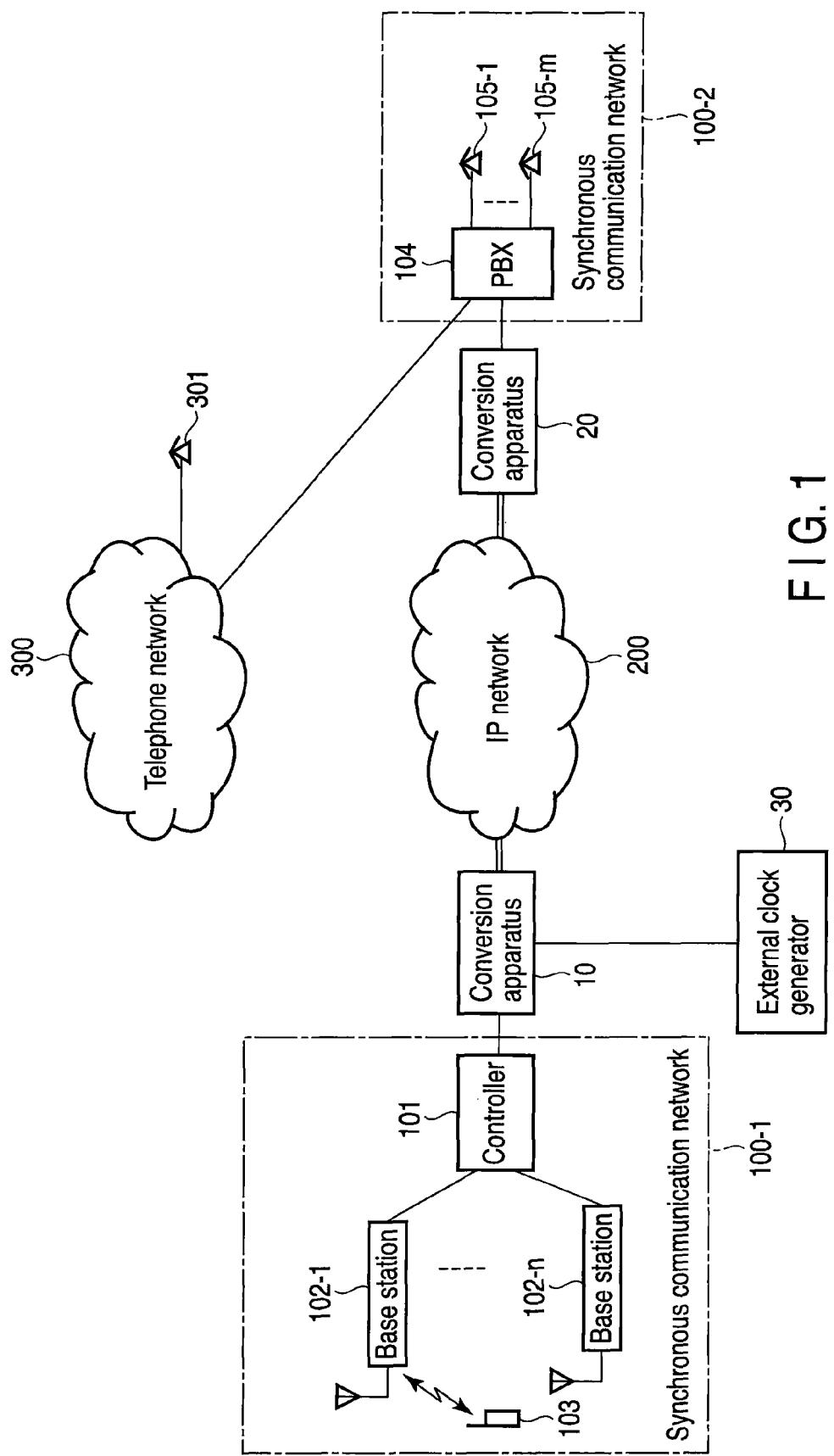
F I G. 1

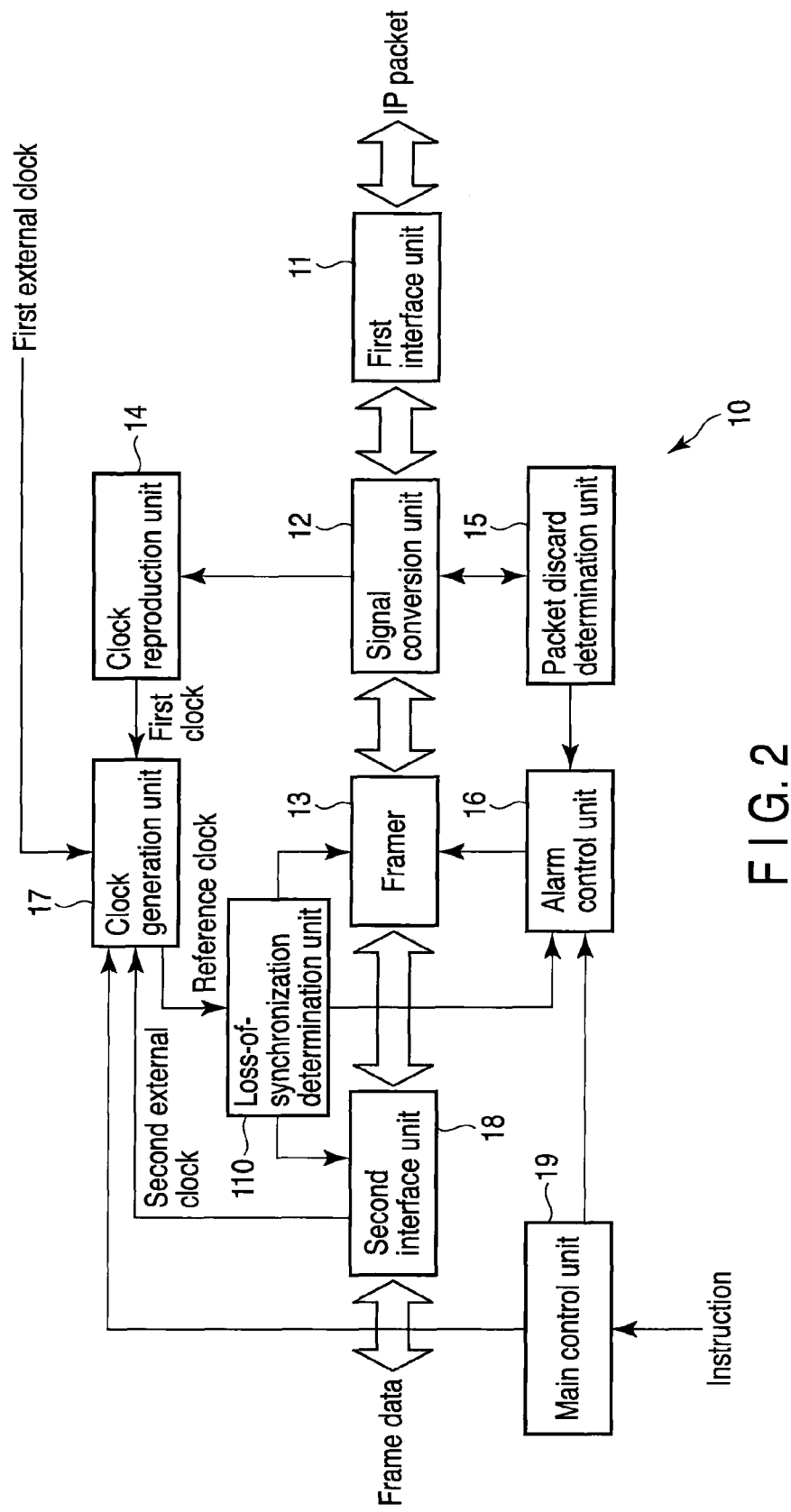
F I G. 2

CONVERSION APPARATUS

CROSS-REFERENCE TO RELATED APPLICATIONS

This application is based upon and claims the benefit of priority from prior Japanese Patent Application No. 2009-016964, filed Jan. 28, 2009, the entire contents of which are incorporated herein by reference.

BACKGROUND OF THE INVENTION

1. Field of the Invention

The present invention relates to, for example, conversion apparatus configured to operate between a synchronous communication network and an asynchronous communication network to convert transmission signals from the communication networks in accordance with the protocols of the respective communication networks.

2. Description of the Related Art

In a conventional communication system, a synchronous communication network accommodates a transmission apparatus used for circuit switching and a terminal apparatus configured to transmit and receive signals to and from the transmission apparatus. In such a communication system, a clock is synchronized between the transmission apparatus and the terminal apparatus. The transmission apparatus and the terminal apparatus carry out data communication by transmitting and receiving data in synchronism with the clock.

In recent years, there has been a demand to change the synchronous communication network to an Internet protocol network (IP network) that is an asynchronous communication network. This is because when a communication infrastructure is used as an IP network instead of a synchronous communication network in which only special apparatuses can be connected to the network as terminals, the number of apparatuses that can be connected to the network increases sharply and apparatus costs reduces. Thus, in association with the change from a synchronous communication network to an IP network that is an asynchronous communication network, conversion apparatuses for communication between the existing synchronous communication network and the IP network have been proposed.

A known technique used for such conversion apparatuses is Circuit Emulation Service over Packet Switched Network (CESoPSN). The CESoPSN technique converts a synchronous clock into a special packet, which is then placed among IP packets for transmission. The conversion apparatus receives and converts the IP packets into original data based on the clock in the special packet.

In the IP network, IP packets are transmitted in accordance with a best-effort transmission scheme. Thus, depending on the transmission environment, transmission of the IP packets may be delayed or IP packets may be discard. Here, if the special packet included in the IP packets is discard, clock synchronization cannot be maintained between the synchronous communication network and the IP network. Thus, if an error such as a discard IP packet occurs, an alarm signal (alarm indication signal [AIS]) is provided to the transmission apparatus connected to the conversion apparatus (see, for example, Jpn. Pat. Appln. KOKAI Publication No. 5-244203). Here, by definition, an AIS means that an error is also occurring in the clock for the circuit. Thus, upon receiving the AIS, the transmission apparatus in the synchronous communication network disconnects from the conversion apparatus. The transmission apparatus then switches the synchronization to its own clock for the synchronous communication network. The transmission apparatus waits for the IP network to recover, and upon receiving the notification that the IP network has recovered, synchronizes with the clock of the conversion apparatus. The transmission apparatus then resumes communication via the conversion apparatus in accordance with the clock.

As described above, even if an error in the IP network causes the communication to be cut off to make the clock between the synchronous communication network and the IP network asynchronous, the recovery of the IP network allows the clock to be synchronized to resume communication. Thus, the asynchronous status of the clock often fails to be acknowledged as a problem. However, if the synchronous communication network accommodates a base station configured to control communication between a plurality of radio terminals, data communication is desirably recovered quickly. In this case, after the error in the IP network is eliminated, a long time may disadvantageously be required to recover the clock synchronization between the synchronous communication network and the IP network.

BRIEF SUMMARY OF THE INVENTION

An object of the present invention is to provide a conversion apparatus configured to enable clock synchronization to be maintained between an IP network and a synchronous communication network even if an error occurs in the IP network.

According to an aspect of the present invention, there is provided a conversion apparatus provided between an asynchronous communication network and a synchronous communication network, the apparatus comprising: a first interface unit connected to the asynchronous communication network to receive a packet signal transmitted from the asynchronous communication network; a signal conversion unit configured to convert the packet signal into an intra-apparatus signal; a packet-discard determination unit configured to determine whether or not any portion of the received packet signal is discard, the packet-discard determination unit generating a packet discard signal if the any portion of the received packet signal is discard, and the packet-discard determination unit generating no packet discard signal if no portion of the received packet signal is discard; a clock selection unit configured to select one of reference clock signals, which is determined based on a clock information including an external clock signal; a loss-of-synchronization determination unit configured to determine whether or not a loss-of-synchronization error is occurring in the reference clock signal, the loss-of-synchronization determination unit generating a loss-of-synchronization signal, if the loss-of-synchronization error is occurring in the reference clock signal, and the loss-of-synchronization determination unit generating a synchronized signal, if no loss-of-synchronization error is occurring in the reference clock signal; an alarm control unit configured to generate one of control signals, the control signals including a first control signal indicating that a frame signal is to be generated, a second control signal indicating that a alarm signal is to be generated for cutting off communication, and a third control signal indicating that a synchronous signal to be generated, the first control signal is generated in response to the no packet discard signal and the synchronized signal, the second control signal is generated in response to the loss-of-synchronization signal, the third control signal is generated in response to the synchronized signal and the packet discard signal; a framer configured to generate the frame signal, the alarm signal, and the synchronous signal, wherein the frame signal is generated based on the intra-apparatus signal using the reference clock signal in response to the first control signal, the alarm signal is generated in response to the second control signal, the synchronous signal is generated in response to the third control signal; and a second interface unit connected to the synchronous communication network to transmit one of the frame signal, the alarm signal, and the synchronous signal to the synchronous communication network.

Additional objects and advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a communication system using a conversion apparatus according to an embodiment of the present invention;

FIG. 2 is a block diagram showing the functional configuration of the conversion apparatus in FIG. 1;

DETAILED DESCRIPTION OF THE INVENTION

Figure 3:
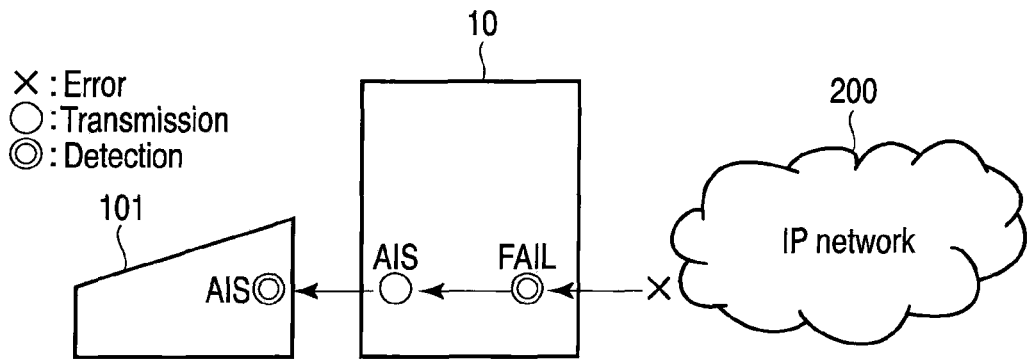
FIG. 3 is a diagram showing processing executed by a conversion apparatus if a main control unit in FIG. 2 specifies a first clock as a reference clock and a packet-discard determination unit has detected a discard IP packet.

An embodiment of a conversion apparatus according to the present invention will be described below with reference to the drawings.

FIG. 1 is a block diagram showing the configuration of a communication system that uses a conversion apparatus 10 according to an embodiment of the present invention. In the communication system in FIG. 1, a synchronous communication network 100-1 and an IP network 200 corresponding to an asynchronous communication network are connected together via a conversion apparatus 10 according to the present invention. The conversion apparatus 10 in the present embodiment is connected to the synchronous communication network 100-1 via a time division multiplexed circuit such as an ISDN primary interface. Furthermore, the conversion apparatus 10 is connected to the IP network 20 using LAN. The conversion apparatus 10 converts IP packets from the IP network 200 into a data stream (hereinafter referred to as a data stream) of a time division multiplexed frame structure specified for the ISDN primary interface or the like and adapted for the synchronous communication network 100-1. Furthermore, the conversion apparatus 10 converts a data stream from the synchronous communication network 100-1 into IP packets adapted for the IP network 200.

Additionally, a synchronous communication network 100-2 and the IP network 200 are connected together via a conventional conversion apparatus 20 that uses the CESoPSN technique. The conversion apparatus 20 is connected to the synchronous communication network 100-2 via an ISDN primary interface. Furthermore, the conversion apparatus 20 is connected to the IP network 200 using LAN. The conversion apparatus 20 converts IP packets from the IP network 200 into a data stream adapted for the synchronous communication network 100-2. Furthermore, the conversion apparatus 20 converts a data stream from the synchronous communication network 100-2 into IP packets adapted for the IP network 200. A telephone network 300 is connected to the synchronous communication network 100-2 via a subscriber's line.

The synchronous communication network 100-1 accommodates a controller 101, base stations 102-1 to 102-n, and a personal station 103. The controller 101 receives a data stream from the conversion apparatus 10 in synchronism with a reference clock of the conversion apparatus 10. The controller 101 transmits the data stream to the personal station 103 via the base stations 102-1 to 102-n.

The synchronous communication network 100-2 accommodates a private branch exchange (PBX) 104 and extensions 105-1 to 105-m. The private branch exchange 104 receives a data stream from the conversion apparatus 20 in synchronism with a reference clock of the conversion apparatus 20. The private branch exchange 104 transmits the data stream to the exchanges 105-1 to 105-m. The private branch exchange 104 transmits the data stream to the telephone network 300 via the subscriber's line. A land phone 301 is connected to the telephone network 300.

The conversion apparatus 10 utilizes the CESoPSN technique to allow the data communication between the asynchronous communication network and the synchronous communication network. An external clock generator 30 is connected to the conversion apparatus 10. The external clock generator 30 outputs a first external clock to the conversion apparatus 10.

The conversion apparatus 10 receives at least one of the first external clock from the external clock generator 30, a first clock supplied as an IP packet from the IP network 200 utilizing LAN, and a second external clock supplied by the synchronous communication network 100-1 utilizing a time division multiplexed circuit. The conversion apparatus 10 uses one of the first clock, the first and second external clocks as the reference clock. Communication utilizing a time division multiplexed circuit is characterized by making the clock more unlikely to be discard than the communication utilizing LAN.

FIG. 2 is a block diagram showing the functional configuration of the conversion apparatus 10 according to an embodiment of the present invention.

A first interface unit 11 receives IP packets from the IP network 200. The IP packets include special packets into which a synchronous clock is converted.

A signal conversion unit 12 converts the IP packets from the interface unit 11 into bit stream, i.e. an intra-apparatus signal. The signal conversion unit 12 supplies the intra-apparatus signal to a framer 13 and a clock reproduction unit 14.

A packet-discard determination unit 15 monitors the IP packets supplied to the signal conversion unit 12 from the interface unit 11. The packet-discard determination unit 15 determines whether or not an IP packet is discard. In the present embodiment, if no IP packet is received during a given period, the packet-discard determination unit 15 determines that an IP packet is discard. Upon determining that an IP packet is discard, the packet-discard determination unit 15 notifies an alarm control unit 16 that an IP packet is discard, i.e. a packet discard signal. On the other hand, if the IP packets are received normally, the packet-discard determination unit 15 notifies the alarm control unit 16 that no portion of the IP packets is discard, i.e. a no packet discard signal.

The clock reproduction unit 14 reproduces the synchronous clock, i.e. the first clock, based on a part of the intra-apparatus signal from the signal conversion unit 12 which corresponds to the special packet. The clock reproduction unit 14 supplies the first clock to a clock selection unit 17.

The clock selection unit 17 receives a clock information. The clock information includes at least one of the first external clock from the external clock generator 30, the first clock from the clock reproduction unit 14, and the second external clock from a second interface unit 18 described below. In response to an instruction from a main control unit 19, the clock selection unit 17 selectively outputs any one of the received clocks to a loss-of-synchronization determination unit 110 as the reference clock. The instruction from the main control unit 19 is based on an externally input instruction. Furthermore, the main control unit 19 notifies the alarm control unit 16 which of the clocks is specified.

The loss-of-synchronization determination unit 110 distributes the reference clock from the clock selection unit 17 to two signals. The loss-of-synchronization determination unit 110 supplies one part of the clock to the framer 13, while supplying the other to the interface unit 18. The loss-of-synchronization determination unit 110 determines whether or not a loss-of-synchronization error is occurring in the reference clock from the clock selection unit 17. Upon detecting a loss-of-synchronization error in the reference clock, the loss-of-synchronization determination unit 110 notifies the alarm control unit 16 of the occurrence of the loss-of-synchronization error, i.e. a loss-of-synchronization signal. On the other hand, if no loss-of-synchronization error is detected, the loss-of-synchronization determination unit 110 notifies the alarm control unit 16 of no occurrence of the loss-of-synchronization error, i.e. a synchronized signal.

The alarm control unit 16 controls the framer 13 based on the notifications from the main control unit 19, the loss-of-synchronization determination unit 110, and the packet-discard determination unit 15. Based on this control, the framer 13 determines whether or not to transmit an alarm indication signal (AIS) to the controller 101. Here, the AIS means a signal obtained by replacing all of the data including a frame synchronization word with a high level, i.e. all "1".

For example, upon receiving the notification from the main control unit 19 indicating that the main control unit 19 has specified the first clock as the reference clock and the notification from the packet-discard determination unit 15 indicating that the packet-discard determination unit 15 has detected a discard IP packet, i.e. the packet discard signal, the alarm control unit 16 controls the framer 13 so that the framer 13 transmits the AIS, i.e. a fourth control signal.

Furthermore, upon receiving the notification from the main control unit 19 indicating that the main control unit 19 has specified one of the first and second external clocks as the reference clock and the notification from the loss-of-synchronization determination unit 110 indicating that the loss-of-synchronization determination unit 110 has detected a loss-of-synchronization error in the reference clock, i.e., the loss-of-synchronization signal, the alarm control unit 16 controls the framer 13 so that the framer 13 transmits the AIS, i.e., a second control signal.

Additionally, upon receiving the notification from the loss-of-synchronization determination unit 110 indicating that no loss-of-synchronization error is detected in the reference clock, i.e. the synchronized signal, and the notification from the packet-discard determination unit 15 indicting that no discard IP packet is detected, i.e., the no packet discard signal, the alarm control unit 16 controls the framer 13 so that the framer 13 transmits a data stream described below, i.e., a first control signal.

Furthermore, the upon receiving the notification from the main control unit 19 indicating that the main control unit 19 has specified one of the first and second external clocks as the reference clock and the notification from the loss-of-synchronization determination unit 110 indicating that the loss-of-synchronization determination unit 110 has detected a loss-of-synchronization error in the reference clock, i.e. the loss-of-synchronization signal, the alarm control unit 16 controls the framer 13 so that the framer 13 transmits the AIS, i.e. a second control signal.

Additionally, the upon receiving the notification from the loss-of-synchronization determination unit 110 indicating that no loss-of-synchronization error is detected in the reference clock, i.e. the synchronized signal, and the notification from the packet-discard determination unit 15 indicting that no discard IP packet is detected, i.e. the no packet discard signal, the alarm control unit 16 controls the framer 13 so that the framer 13 transmits a data stream described below, i.e. a first control signal.

The framer 13 converts the intra-apparatus signal from the signal conversion unit 12 into the data stream of time division multiplexed frame structure specified for the ISDN primary interface in accordance with the reference clock from the loss-of-synchronization determination unit 110 in response to the first control signal. The framer 13 outputs the data stream to the interface unit 18. Furthermore, upon being controlled by the alarm control unit 16 so as to transmit the AIS, i.e. the second or fourth control signals, the framer 13 generates the AIS instead of the data stream. The framer 13 then outputs the AIS to the interface unit 18. Additionally, upon being controlled by the alarm control unit 16 so as to transmit a frame synchronization signal, i.e. the third control signal, the framer 13 generates the frame synchronization signal instead of the data steam.

The second interface unit 18 converts the data stream, the AIS, or the frame synchronization signal from the framer 13 into an electrical signal specified in the standards. The interface unit 18 transmits the electrical signal to the controller 101 in accordance with the reference clock from the loss-of-synchronization determination unit 110. The output electrical signal is transmitted to the controller 101 by the ISDN primary interface.

Furthermore, the interface unit 18 receives the frame data from the controller 101. The interface unit 18 extracts a clock from the frame data. The interface unit 18 outputs the clock to the clock selection unit 17 as the second external clock.

Figure 4:
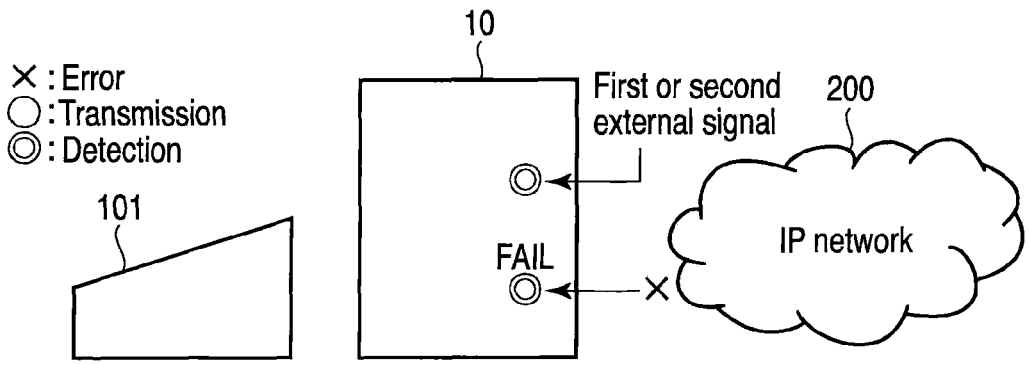
FIG. 4 is a diagram showing processing executed by a conversion apparatus if the main control unit in FIG. 2 specifies one of a first and second external clocks as a reference clock and the packet-discard determination unit detects a discard IP packet.
Figure 5:
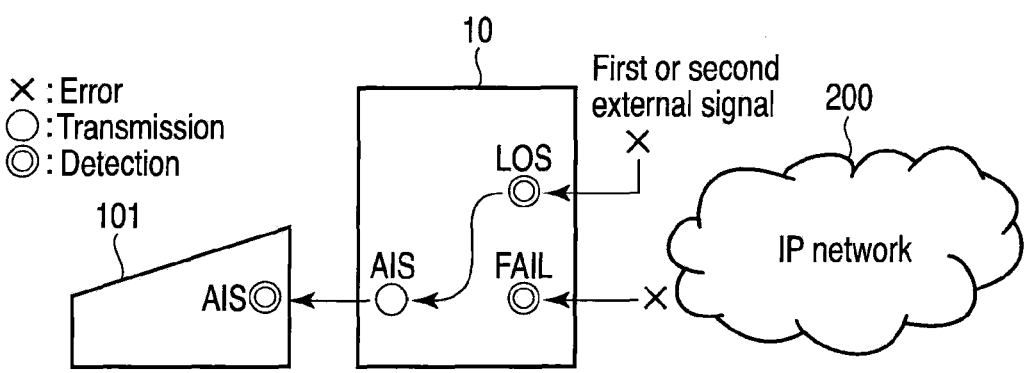
FIG. 5 is a diagram showing processing executed by a conversion apparatus if a main control unit in FIG. 2 specifies one of the first and second external clocks as a reference clock and a loss-of-synchronization determination unit detects a loss-of-synchronization error in the reference clock.

Now, the operation of the above-described configuration will be described. FIGS. 3 to 5 are schematic diagrams showing processing executed by the conversion apparatus 10.

FIG. 3 is a schematic diagram showing processing executed by the conversion apparatus 10 if the main control unit 19 specifies the first clock as the reference clock and the packet-discard determination unit 15 has detected a discard IP packet.

If the main control unit 19 specifies the first clock and the packet-discard determination unit 15 has detected a discard IP packet, the alarm control unit 16 allows the framer 13 to generate the AIS. Thus, the conversion apparatus 10 transmits the AIS to the controller 101 instead of the data stream.

Furthermore, if the main control unit 19 specifies the first clock and the loss-of-synchronization determination unit 110 has detected a loss-of-synchronization error in the first clock, the alarm control unit 16 allows the framer 13 to generate the AIS. Thus, the conversion apparatus 10 transmits the AIS to the controller 101 instead of the data stream. Upon receiving the AIS, the controller 101 disconnects from the conversion apparatus 10.

FIG. 4 is a schematic diagram showing processing executed by the conversion apparatus 10 if the main control unit 19 specifies one of the first and second external clocks as the reference clock and the packet-discard determination unit 15 has detected a discard IP packet. If the main control unit 19 specifies one of the first and second external clocks, the alarm control unit 16 avoids allowing the framer 13 to generate the AIS even when the packet-discard determination unit 15 detects a discard IP packet. Thus, the conversion apparatus 10 avoids transmitting the AIS to the controller 101. At this time, the conversion apparatus 10 transmits the frame synchronization signal from the interface unit 18 to the controller 101. Thus, the conversion apparatus 10 can maintain clock synchronization with the controller 101.

FIG. 5 is a schematic diagram a schematic diagram showing processing executed by the conversion apparatus 10 if the main control unit 19 specifies one of the first and second external clocks as the reference clock and the loss-of-synchronization determination unit 110 has detected a loss-of-synchronization error in the reference clock. In this case, if the main control unit 19 specifies one of the first and second external clocks as the reference clock and the loss-of-synchronization determination unit 110 has detected a loss-of-synchronization error in the reference clock, the alarm control unit 16 allows the framer 13 to generate the AIS. FIG. 5 shows that an IP packet is discard, by way of example. However, the alarm control unit 16 controls the framer 13 as described above regardless of whether or not an IP packet is discard. Thus, the conversion apparatus 10 transmits the AIS to the controller 101 instead of the data stream. Upon receiving the AIS, the controller 101 disconnects from the conversion apparatus 10.

As described above, in the above-described embodiment, the clock selection unit 17 selects the first clock contained in the IP packets, the first external clock, or the second external clock based on the clock for the synchronous communication network as the reference clock. The conversion apparatus 10 then converts the IP packets received from the IP network into a data stream of the time division multiplexed frame structure such as the ISDN primary interface in accordance with the reference clock. The conversion apparatus 10 then outputs the data stream to the controller 101.

Furthermore, the conversion apparatus 10 allows the packet-discard determination section 15 to detect a discard IP packet. The conversion apparatus 10 also allows the loss-of-synchronization determination unit 110 to detect a loss-of-synchronization error in the reference clock. If the first clock is specified as the reference clock and an IP packet is discard, the conversion apparatus 10 transmits the AIS to the controller 101. However, if one of the first and second external clocks is specified as the reference clock, the conversion apparatus 10 avoids transmitting the AIS to the controller 101 even if an IP packet is discard, provided that the loss-of-synchronization error is not occurring in the reference clock.

Thus, even if an error or the like occurs in the IP network and an IP packet is discard, the AIS is not transmitted to the controller 101 provided that one of the first and second external clocks is selected as the reference clock. That is, the conversion apparatus 10 and the controller 101 are prevented from being disconnected from each other. Furthermore, since the frame synchronization signal is transmitted to the synchronous communication network in spite of a discard IP packet, the clock between the IP network and the synchronous communication network is prevented from being asynchronous.

Therefore, even if an error occurs in the IP network, the conversion apparatus according to the present invention can maintain the clock synchronization between the IP network and the synchronous communication network. Furthermore, with the conversion apparatus according to the present invention, since the clock synchronization is maintained between the synchronous communication network and the IP network even with an error in the IP network, the radio terminals accommodated in the synchronous communication network can resume data communication immediately after the error in the IP network has been eliminated.

The present invention is not limited to the as-described embodiment. For example, in the above-described embodiment, the conversion apparatus 10 receives both the first and second external clocks. However, the present invention is not limited to this aspect. That is, the present invention can be implemented even if the conversion apparatus 10 receives one of the first and second external clocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A conversion apparatus comprising:
   a first interface unit connected to an asynchronous communication network to receive a packet signal transmitted from the asynchronous communication network, the packet signal including a special packet into which a first clock signal is converted;
   a signal conversion unit configured to convert the packet signal into an intra-apparatus signal;
   a packet-discard determination unit configured to determine the packet signal is discard if no packet signal is received during a predetermined period and to generate a packet discard signal in response to the determination,
   a clock reproduction unit configured to reproduce the first clock signal based on the special packet included in the intra-apparatus signal;
   a clock selection unit configured to receive an external clock signal and the first clock signal and to select the external clock signal or the first clock signal as a reference clock signal, the external clock signal being generated at an external device,
   a loss-of-synchronization determination unit configured to determine whether or not a loss-of-synchronization error occurs in the reference clock signal and to generate a loss-of-synchronization signal the loss-of-synchronization error occurs in the reference clock signal;
   an alarm control unit configured to generate a first control signal if the packet discard signal or the loss-of-synchronization signal is not generated, to generate a second control signal if the external clock signal is selected as the reference clock signal and the loss-of-synchronization signal is generated, or if the first clock signal is selected as the reference clock signal and at least one of the packet discard signal and the loss-of-synchronization signal is generated, and to generate a third control signal if the external clock signal is selected as the reference clock signal and the packet discard signal is generated;

a framer configured to convert the intra-apparatus signal into a data stream in accordance with the reference clock signal in response to the first control signal, to generate an alarm signal for cutting off communication in response to the second control signal, and to generate a synchronous signal in response to the third control signal; and a second interface unit connected to a synchronous communication network to transmit one of the data stream, the alarm signal, and the synchronous signal to the synchronous communication network.

2. The conversion apparatus according to claim 1, wherein a CESoPSN (RFC5086 Structure-Aware Time Division Multiplexed [TDM] Circuit Emulation Service over Packet Switched Network) technique is applied to the connection between the asynchronous communication network and the first interface unit.

3. The conversion apparatus according to claim 1, wherein the external clock signal includes one of first and second external clock signals, the first external clock signal being supplied from an external clock generator outside of the conversion apparatus, the second external clock signal being extracted from frame data transmitted from the synchronous communication network.

4. The conversion apparatus according to claim 1, wherein:
the external clock signal includes first and second external clock signals, the first external clock signal being supplied from an external clock generator outside of the conversion apparatus, the second external clock signal being extracted from frame data transmitted from the synchronous communication network;

the clock selection unit receives the first external clock signal, the second external clock signal and the first clock signal, and selects the first external clock signal, the second external clock signal or the first clock signal as the reference clock signal;

the alarm control unit generates the second control signal if the first or second external clock signal is selected as the reference clock signal and the loss-of-synchronization signal is generated, and generates the third control signal if the first or second external clock signal is selected as the reference clock signal and the packet discard signal is generated.

* * * * *

UNITED STATES PATENT AND TRADEMARK OFFICE
CERTIFICATE OF CORRECTION

PATENT NO. : 8,379,669 B2
APPLICATION NO. : 12/694635
DATED : February 19, 2013
INVENTOR(S) : Suzuki Page 1 of 1

It is certified that error appears in the above-identified patent and that said Letters Patent is hereby corrected as shown below:

In the Claims:

Claim 1, column 8, line 62, change "signal the loss-of-synchronization error occurs" to --signal if the loss-of-synchronization error occurs--.

Signed and Sealed this
Fourteenth Day of May, 2013

Teresa Stanek Rea
*Acting Director of the United States Patent and Trademark Office*